Oct. 17, 1933.　　　　G. B. PITTS　　　1,930,486
INDUSTRIAL TRUCK
Filed Aug. 10, 1931　　　6 Sheets-Sheet 1

INVENTOR
George B Pitts

Oct. 17, 1933.  G. B. PITTS  1,930,486
INDUSTRIAL TRUCK
Filed Aug. 10, 1931   6 Sheets-Sheet 2

INVENTOR
George B. Pitts

Oct. 17, 1933.   G. B. PITTS   1,930,486
INDUSTRIAL TRUCK
Filed Aug. 10, 1931   6 Sheets-Sheet 3

INVENTOR
George B. Pitts

Oct. 17, 1933.  G. B. PITTS  1,930,486
INDUSTRIAL TRUCK
Filed Aug. 10, 1931  6 Sheets-Sheet 4

INVENTOR
George B Pitts

Oct. 17, 1933.  G. B. PITTS  1,930,486

INDUSTRIAL TRUCK

Filed Aug. 10, 1931  6 Sheets-Sheet 5

INVENTOR
George B Pitts

Patented Oct. 17, 1933

1,930,486

UNITED STATES PATENT OFFICE 1,930,486

INDUSTRIAL TRUCK

George B. Pitts, Cleveland Heights, Ohio, assignor to The Baker-Raulang Company, Cleveland, Ohio, a corporation of Ohio Application August 10, 1931. Serial No. 556,269

25 Claims. (Cl. 214—113)

This invention relates to an industrial tiering truck adapted to raise or lower loads and to transport them from place to place.

One object of the invention is to provide an improved tiering mechanism for an industrial truck in which provision is made for tilting the load carrier rearwardly or forwardly at will at any elevation thereof or to maintain it in normal position.

Another object of the invention is to provide an improved tiering mechanism having a load carrier which may be tilted inwardly or outwardly and tilting means therefor so arranged that the power for the tiering mechanism is utilized at will to effect operation of the tilting means to tilt the carrier.

Another object of the invention is to provide an improved tiering mechanism having a load carrier which may be tilted inwardly or outwardly and tilting means therefor which is locked to prevent its operation due to the weight of the load, but is released when power is applied to the tilting means to tilt the carrier.

Other objects of the invention will be apparent to those skilled in the art to which my invention relates from the following description taken in connection with the accompanying drawings, wherein

Fig. 10a is a fragmentary plan view of a portion of the tilting means, with parts being broken away.

Figure 7:
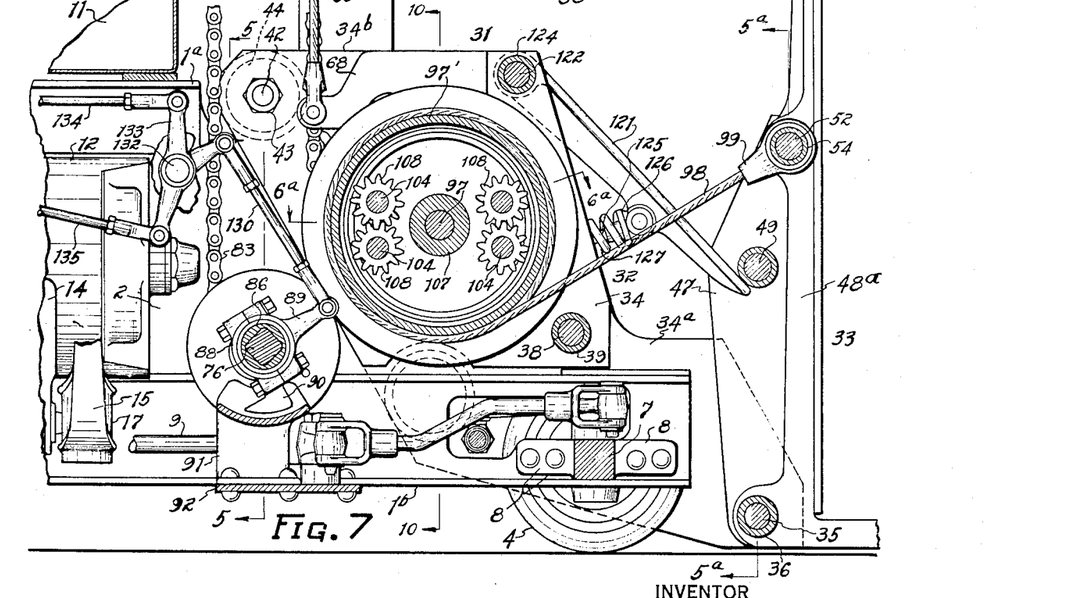
Fig. 7 is a fragmentary section on the line 7—7 of Fig. 6.
Figure 10:
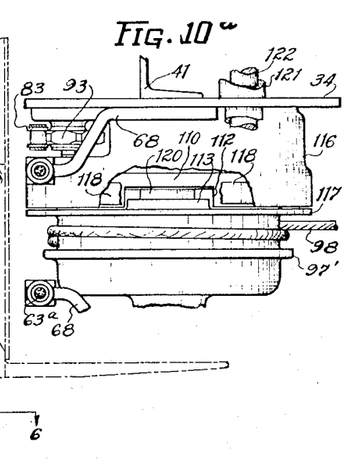
Fig. 10 is a fragmentary section on the line 10—10 of Fig. 7.
Figures 10, 11:
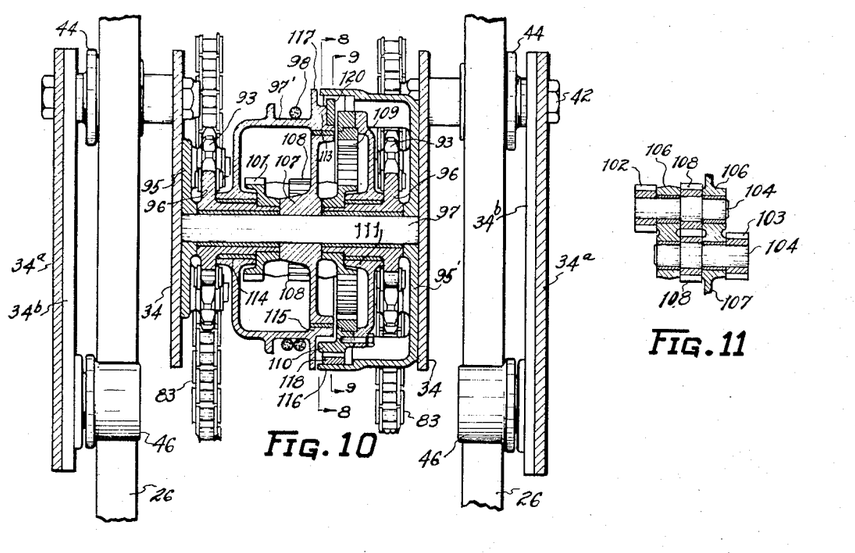
Fig. 11 is a section on the line 11—11 of Fig. 6.

In the drawings, 1 indicates a frame having a main or elevated portion 1a and a low portion 1b, preferably consisting of angles and channels, respectively, and side plates 2 rigidly connected together. 3 indicates a pair of large wheels below the main section 1a; 4 indicates a pair of relatively small load wheels supporting the low frame portion 1b. The wheels 3 are steerably mounted in a well known manner on yokes 5 provided at the opposite ends of an axle 6. The wheels 4 are steerably mounted on suitable knuckles provided at the opposite end of an axle 7, extending through the channels 1b and held in fixed position by devices 8 (Fig. 7).

The wheels 3, 4, are connected together for simultaneous steering by connections 9, which are operated by a tiller 10.

11 indicates a power supply preferably comprising electric batteries mounted on the frame portion 1a. 12 indicates an electric motor, which receives power from the batteries 11, and operates through a suitable power transmitting mechanism to drive the wheels 3, the power mechanism being enclosed in a housing 13, forming part of the axle 6. The inner end of the housing is extended to form a cradle 14 to which the motor 12 is rigidly secured. The outer end of the cradle 14 is supported by a torque member 15, preferably of U-shape, trunnioned at its ends at 16 on the side plates 2 and connected by a universal joint 17 to the free end of the cradle 14. The torque member and its mounting are preferably similar to corresponding parts shown in Letters Patent No. 1,628,145, dated May 10, 1927. 18 indicates a pair of upright angles at the outer end of the frame portion 1a, suitably connected thereto by gussets 18a. At their lower ends the uprights are provided with brackets 19 on which is swingably supported a platform 20 for an operative or driver. 21 indicates a foot pedal associated with the platform 20 and connected through a linkage 22 to brake mechanism 22' comprising a brake wheel fixed to the outer end of the propeller shaft (which is driven by the motor 12) and brake shoes. The brake shoes are normally biased into braking relation with the brake wheel by a spring (not shown) connected to the linkage 22, so that when the foot pedal is depressed the brake is released.

23 indicates a controller by which the current from the batteries 11 is supplied to the motor 12, the operating shaft of the controller being connected by a link 24 to an operating lever 25.

26 indicates a guide preferably disposed in a vertical plane inwardly of the wheels 4. The guide comprises a pair of spaced channels, which in the illustrated construction are secured at their lower ends to the outer faces of the side plates 2. The upper ends of the guide channels are connected by a cross member 27 and provided with upper and lower side members 28, 28a, which in turn are connected by an angle 29. The side members 28 are connected to the uprights 18 by channel members 30, which brace the upper end of the guide frame 26.

Figures 1, 14:
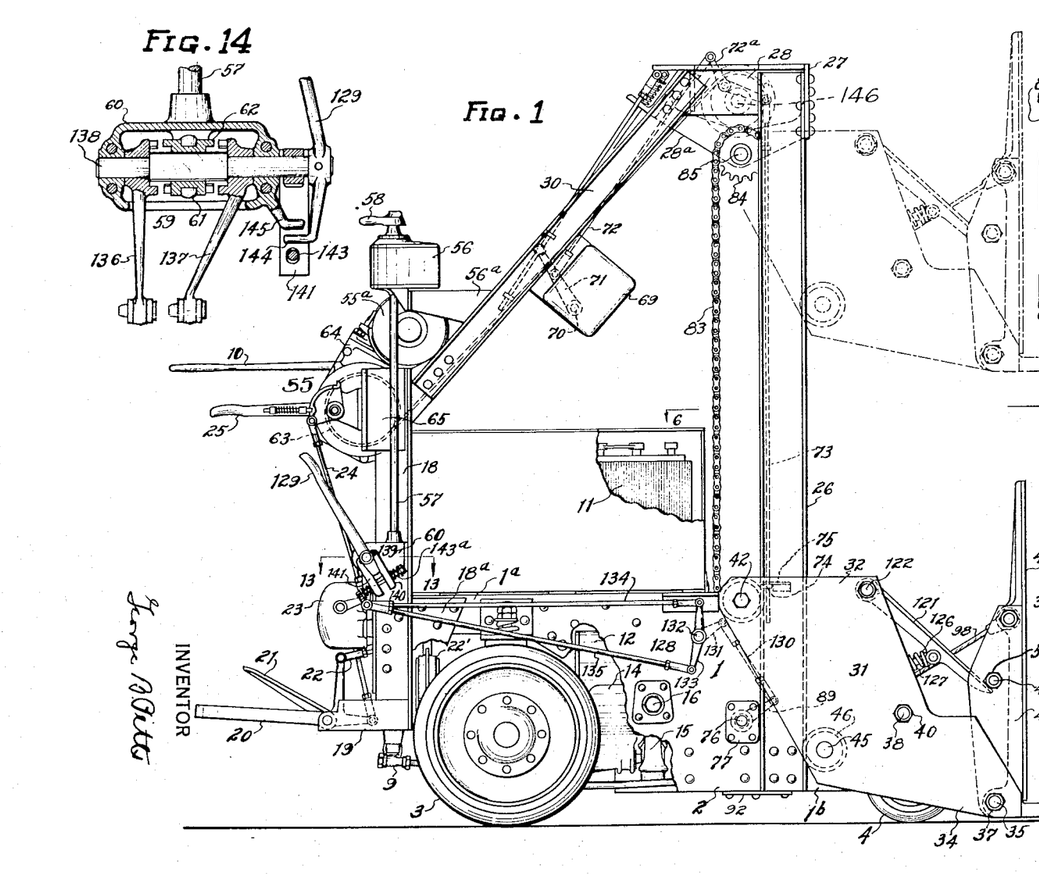
Fig. 1 is a side elevation of a truck embodying my invention.
Fig. 14 is a section on the line 14—14 of Fig. 13.

31 indicates as an entirety an elevating member comprising a carriage 32 which slidably engages the guide frame 26 and a load carrier 33 mounted on the carriage to move therewith upwardly and downwardly and also to swing relative to the carriage from a normal position inwardly to support the load in an inclined position during transportation and outwardly to discharge a load by gravity when desired. The carriage 32 comprises pairs of inner and outer plates 34, 34a, and connections between them for supporting the plates in rigid spaced relation, the outer plates being extended downwardly and outwardly so as to support the carrier 33 beyond the front end of the frame portion 1b and to permit the carrier to be positioned adjacent the floor, as shown in Figs. 1 and 7. One of these connections consists of a rod 35 surrounded by sleeves 36, 36a, against the ends of which (and walls later referred to) the plates 34a are clamped by nuts 37 threaded on the free ends of the rod 35. Another of these connections consists of a rod 38 extending through aligned openings formed in the plates 34, 34a, 34, 34a, and sleeves 39 interposed between the plates, which are clamped against the sleeves by nuts 40 threaded on the free ends of the rod 38. The plates 34, 34a, of each pair are also connected in spaced relation by a channel section 41 and a bolt 42 provided with a bushing between the plates, the plates being clamped against the bushing by a nut 43 threaded on the bolt. The bushing serves as a shaft for a roller 44 which rolls on the inner side of the adjacent channel 26.

45 indicates a stud shaft mounted in each plate 34a and loosely supporting a roller 46 which rolls on the outer side of the adjacent channel 26. The portion of each plate 34a carrying the adjacent bolt 42 and stud shaft 45 is preferably reinforced by a plate 34b.

Figures 15, 16:
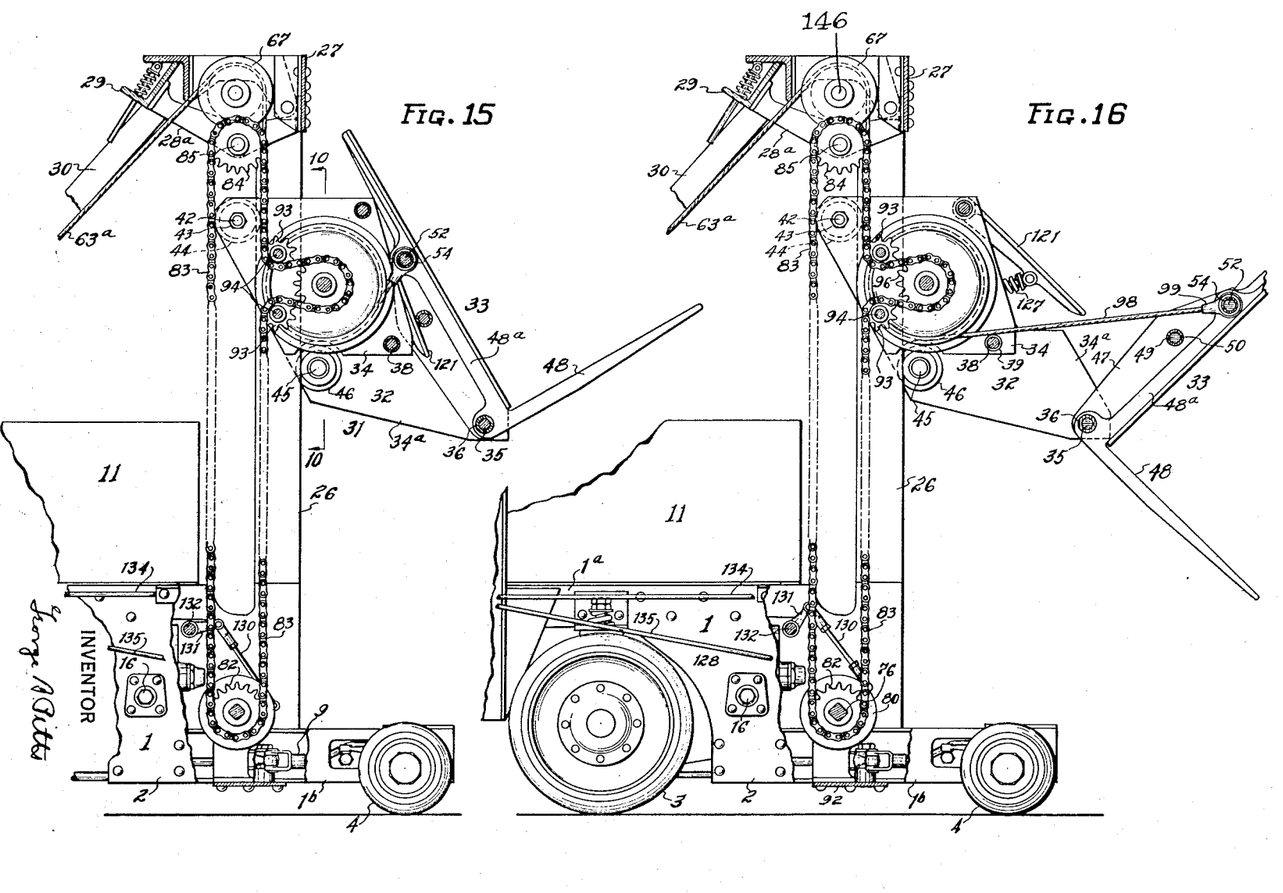
Fig. 15 is a fragmentary section substantially on the line 15—15 of Fig. 4, but showing the load carrier tilted inwardly.
Fig. 16 is a view similar to Fig. 15, but showing the load carrier tilted outwardly.

The load carrier 33 comprises a pair of plates 47, connections for spacing and rigidly securing the plates together, and load engaging and supporting elements 48. One of the connections for rigidly spacing the plates 47 consist of a rod 49 having reduced ends forming shoulders against which the plates 47 are clamped by nuts 51 threaded on the free ends of the rod 49. The other connections consist of a rod 52 around which are provided spacing elements, the plates 47 being clamped against these elements by nuts 53 threaded on the ends of the rod 52. The spacing elements just referred to consist of a sleeve 54 and thickened walls of the vertical legs 48a of the elements 48, through which the rod 52 extends (Fig. 5), the sleeve 54 being disposed between the legs 48a. The nuts 53 serve to clamp the plates 47, legs 48a and sleeve 54 rigidly together. The lower ends of the legs 48a have thickened or enlarged walls, formed with openings through which the rod 35 extends, these walls being disposed between the plates 47 and the ends of the sleeve 36. On the outer sides of the plates 47 are provided sleeves or bushings 36a, which rotatively fit openings formed in the plates 34a, and nuts 37 which clamp the sleeves 36a, plates 47, legs 48a and sleeve 36 together. The legs 48a being connected as just described they remain in fixed relation to the plates 47 when the latter are tilted forwardly as shown in Fig. 16 or inwardly as shown in Fig. 15.

Figure 4:
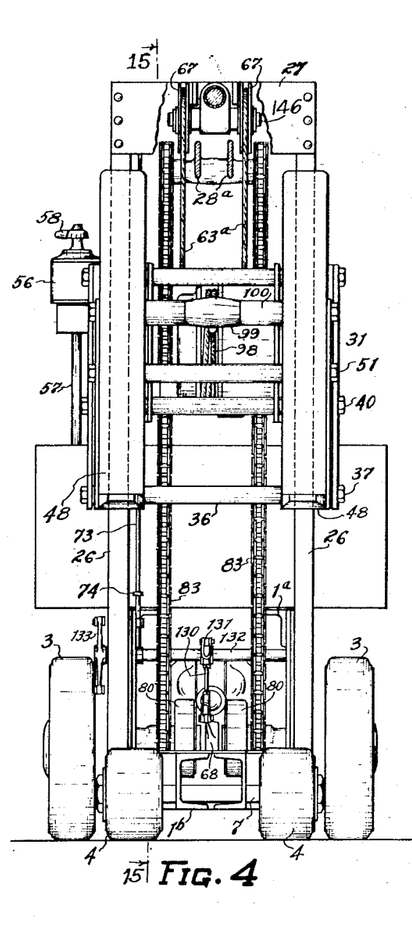
Fig. 4 is a front elevation, with the elevating member in a raised position.

55 indicates as an entirety the hoisting means for the elevating member 31. Of these means, 55a indicates a motor receiving current from the batteries 11, the supply of current thereto being controlled by a controller 56, the operating shaft 57 of which is provided with a handle 58 and such shaft operates a double throw clutch 59, inclosed in a casing 60. By preference, the shaft 57 is extended downwardly, has bearing in the casing 60 and carries an arm 61 operatively connected with the intermediate member 62 of the clutch 59, the purpose of which will later be described. The controller 56 is carried by a bracket 56a supported on the adjacent brace channel 30. The motor 55a drives a suitable power transmitting mechanism having suitable reduction gearing, to rotate simultaneously in one direction or the other, two drums 63, on which a pair of flexible members, such as cables 63a, wind and unwind. The power transmitting mechanism driven by the motor 55a, the reduction gearing and drums are mounted within suitable housing members 64 which are suitably connected together and supported by angle sections 65 on the uprights 18. The shaft of the motor 55a is braked by a magnetic brake mounted in a casing 66. The motor, power transmitting mechanism driven thereby, reduction gearing and brake are substantially similar to corresponding parts shown in a co-pending application Ser. No. 133,699, filed by E. H. Remde, of Cleveland, Ohio, for which reason further description of the parts will not be necessary. The cables 63a extend to and around guide sheaves 67 mounted, as hereinafter set forth, at the upper end of the guide frame 26; and from the sheaves 67 the cables extend downwardly and are connected to arms 68 suitably secured to the plates 34. As will be understood, when the cables 63a are wound on the drums 63 the elevating member 31 is raised on the guide frame (see Fig. 4) and when the cables are paid out, the elevating member is lowered (see Figs. 1 and 7).

When the elevating member 31 is raised or lowered to the limit of its movement, it operates a switch mechanism to break the circuit to the motor 55a. This mechanism comprises a pair of switches enclosed in a casing 69. The operation of either switch is effected by a member fixed to a rock shaft 70 provided with an arm 71. The arm 71 is connected by a rod 72 to one end of a bell crank 72a mounted on the adjacent angle 28. From the other end of the bell crank 72a is suspended a rod 73 carrying adjustable tappets 74. The tappets are disposed in position to be engaged by a lug 75 fixed to one of the plates 34 (see Fig. 6). When the upper tappet is engaged by the lug 75, the rod 73 is moved upwardly and through the bell crank 72a, arm 71 and rock shaft one switch in the casing 69 is opened; when the lower tappet is engaged by the lug 75, these parts are operated in the opposite direction to open the other switch in the casing 69. The construction and operation of the switch mechanism is preferably similar to corresponding parts disclosed in Letters Patent No. 1,726,717, dated September 3, 1929.

The normal position of the carrier 33 relative to the carriage 32 is shown in Fig. 1. In this position of the carrier, the truck may be driven forwardly to engage a load or backed away to discharge a load; also, the carriage may be raised and lowered, and when raised, the truck may be driven to pick up or discharge a load, at any desired level, one elevated position of the carriage with the carrier in its normal position being shown in dotted lines in Fig. 1, and in full lines in Fig. 4.

As later set forth herein, provision is made for holding the carrier against outward tilting movement from its normal position or any position to which it may be tilted or swung and means separate from its tilting means, are provided for swinging the carrier from its inwardly tilted position to its normal position and maintaining it in such position, except when the tilting means are operated to tilt the carrier inwardly.

Figure 5:
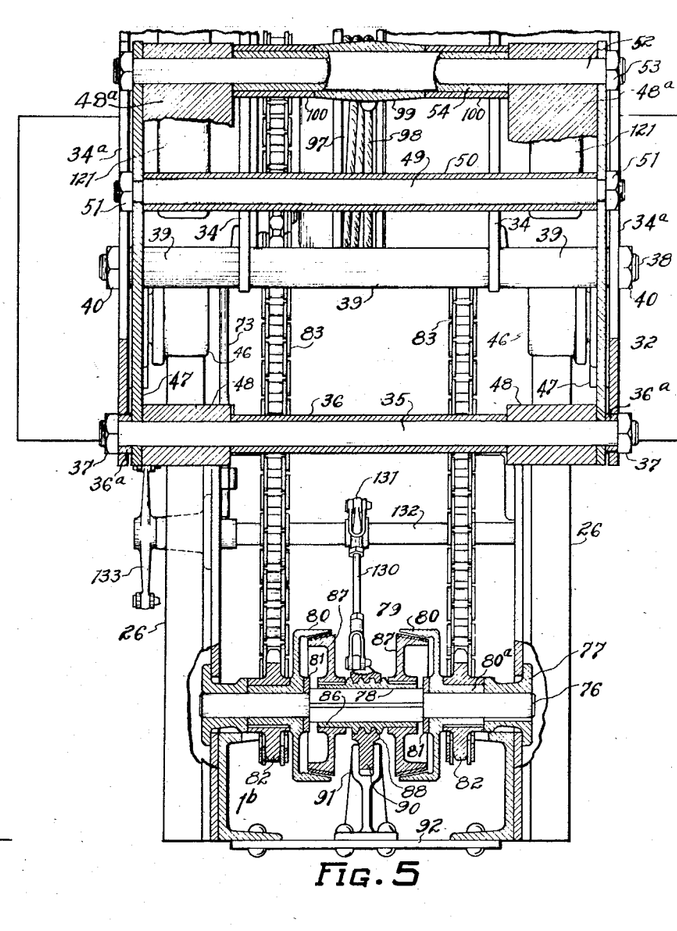
Fig. 5 is a fragmentary section partly on the line 5—5 and partly on the line 5a—5a of Fig. 7, the elevating member being shown raised (as in Fig. 4) to facilitate the illustration.

I provide means for tilting the carrier (a) inwardly, as shown in Fig. 15, so that during transportation the carrier serves as a cradle for the load to reduce tendency of spilling or shifting on the carrier, and (b) outwardly, as shown in Fig. 16, so that the load may be quickly and easily discharged by gravity. As will later appear, the carriage 32 may be raised and lowered with the carrier 33 disposed in either tilted position. The tilting mechanism is co-operatively related to the hoist mechanism 55, so that the power thereof may be utilized to (a) tilt the carrier inwardly or from its outwardly tilted position to its normal or inwardly tilted position and (b) permit outward movement from its normal position or from its inwardly tilted position to normal or outwardly tilted position. Of the tilting means, 76 indicates a shaft fixedly mounted in supports 77 fixed to the plates 2. The intermediate portion of the shaft 76 is of non-circular shape and slidably supports the intermediate clutch member 78 of a double clutch 79, whereby such member may alternately engage outer clutch members 80. The clutch 79 is preferably of the friction type to permit controlled slippage when the carrier is tilted to its extreme position in either direction and movement of the carriage 32 is continued after tilting of the carrier 33 is effected. The hub 80a of each outer clutch member 80 loosely rotates on the adjacent outer portion of the shaft 76, being held against the adjacent support 77 by a collar 81 seated against the end walls of the non-circular portion of the shaft 76. Where the operating connections between the clutch elements 80 and the tilting mechanism hereinafter described include chains 83, each hub 80a has keyed to it a sprocket 82 around which one of the chains 83 runs. The chains 83 extend upwardly and run around sprockets 84 loosely mounted on the outer ends of a shaft 85, which is supported by the members 28a. The upper and lower ends of the chains 83 are guided by the sprockets 82, 84 and their intermediate portions are operatively connected to the carriage 32 so that when the latter is moved upwardly or downwardly the chains are carried as a unit therewith, but by stopping one chain or the other in such movement with the carriage, continued movement of the latter will cause the carrier to be tilted inwardly or outwardly as desired. The upper and lower ends of the chains 83 may be supported in any desired manner to compensate for their movement as the carriage moves on its guides, but in the preferred arrangement these ends are connected to form endless chains which may travel on the sprockets 82, 84, in either direction, in outer and inner runs. The chains are free to be driven about the sprockets 82, 84, when the clutch member 78 is in mid position, as shown in Fig. 5. In this form of construction, the outer runs of the chains 83 are (a) operatively connected to the carriage 32, whereby the chains are driven thereby, that is, move with the carriage as a unit, when the elevating member is raised or lowered to elevate or lower a load and (b) one chain is operatively connected to the carrier 33 to tilt it when the intermediate clutch member 78 is moved into engagement with either one of the outer clutch members 80. The intermediate clutch member 78 comprises a sleeve 86 slidably fitting the intermediate non-circular portion of the shaft 76 and fixedly carries at its ends disks 87 provided on their peripheries with friction elements arranged to engage and disengage friction elements on the members 80. Between the disks 87, the sleeve 86 is provided with screw threads with which a nut 88 engages. The nut 88 is provided on one side with an arm 89, by which it is operated in the manner later set forth and on another side it is provided with a flange 90, which is disposed between guides 91 and moves relative thereto when the nut 88 is rotated. The guides 91 being fixed to a cross plate 92 (carried by the channels 1b, see Figs. 5 and 7), they prevent movement of the nut endwise of the shaft 76; accordingly when the nut 88 is rotated it will move the clutch member 78 endwise dependent upon the direction of rotation of the nut and effect engagement of one disk 87 with the adjacent clutch member 80 or disengagement therefrom. The outer run of each chain 83 runs around upper and lower sprockets 93 (see Figs. 6, 15 and 16) loosely mounted on stud shafts 94 which are supported in plates 95, the latter being fixed to the inner faces of the plates 34 (see Figs. 6 and 10); and between the sprockets 93, the adjacent chain runs around a sprocket 96 loosely mounted on a shaft 97, which is mounted in and keyed to the plates 95. This arrangement forms an operative connection between the chains and carriage 32 so that when the carriage is raised or lowered, the chains are driven by the carriage around the sprockets 82, 84, provided the clutch member 78 is in mid position, but in the event such member engages one of the clutch members 80, the rotation of the latter will be arrested so that movement of the adjacent chain will be stopped, the effect of which will be to rotate the adjacent sprocket 96, which in turn will rotate a drum 97', through gearing to be later referred to. 98 indicates a flexible member, such as a cable, suitably connected at its inner end to the drum 97' and arranged to wind thereon and thereoff. The outer end of the cable 98 is connected to a sleeve 99 rotatably fitting the sleeve 54 on the rod 52 and held in position by spacing sleeves 100. When the cable 98 is wound on the drum 97', the carrier is tilted inwardly and when the cable 98 unwinds from the drum the carrier is free to be tilted outwardly, as hereinafter described.

Figures 2, 3, 8, 9:
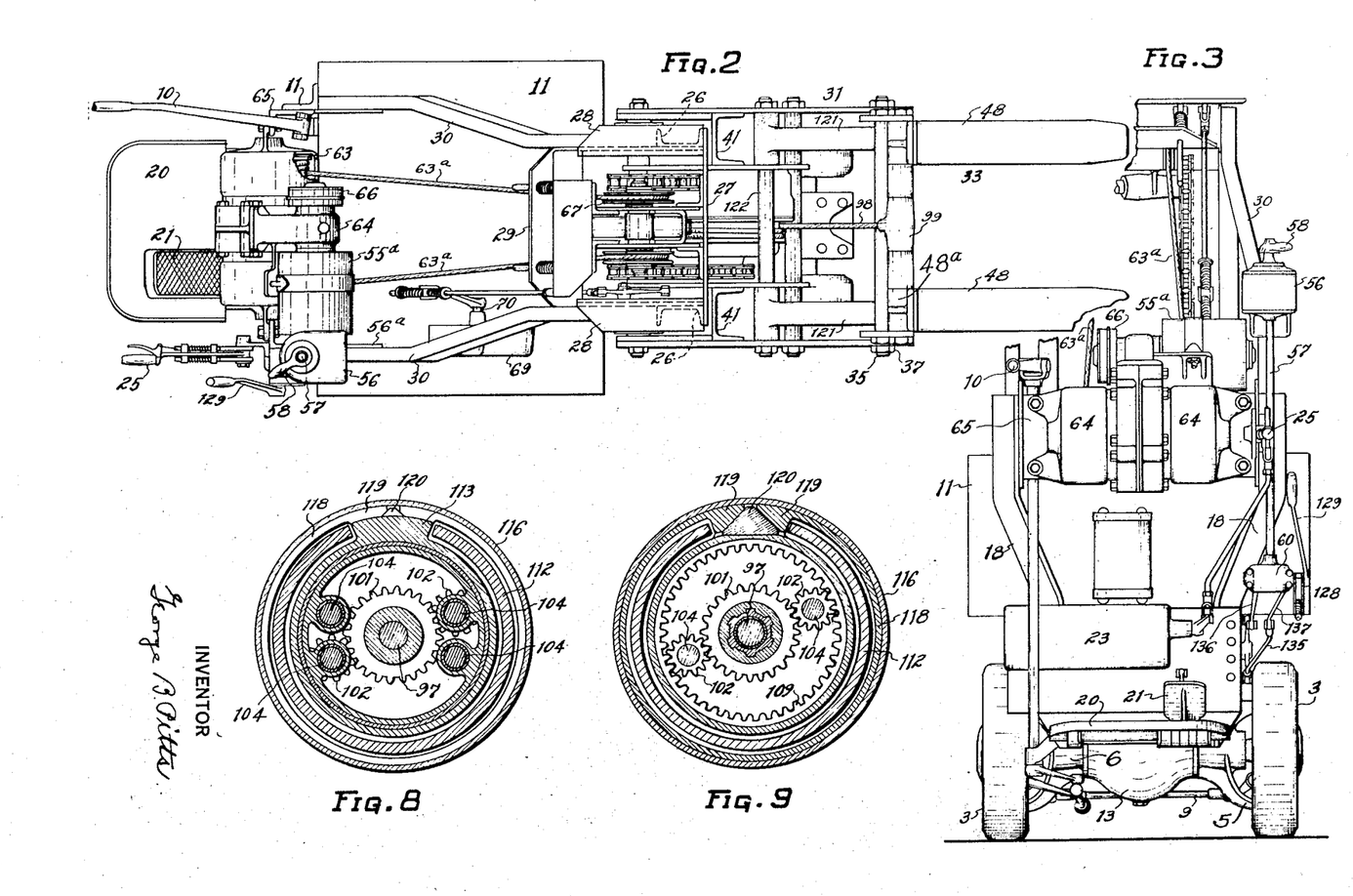
Fig. 2 is a plan view of the truck.
Fig. 3 is a rear end elevation, parts being broken away.
Fig. 8 is a fragmentary section on the line 8—8 of Figs. 6 and 10.
Fig. 9 is a section on the line 9—9 of Figs. 6 and 10.
Figure 6:
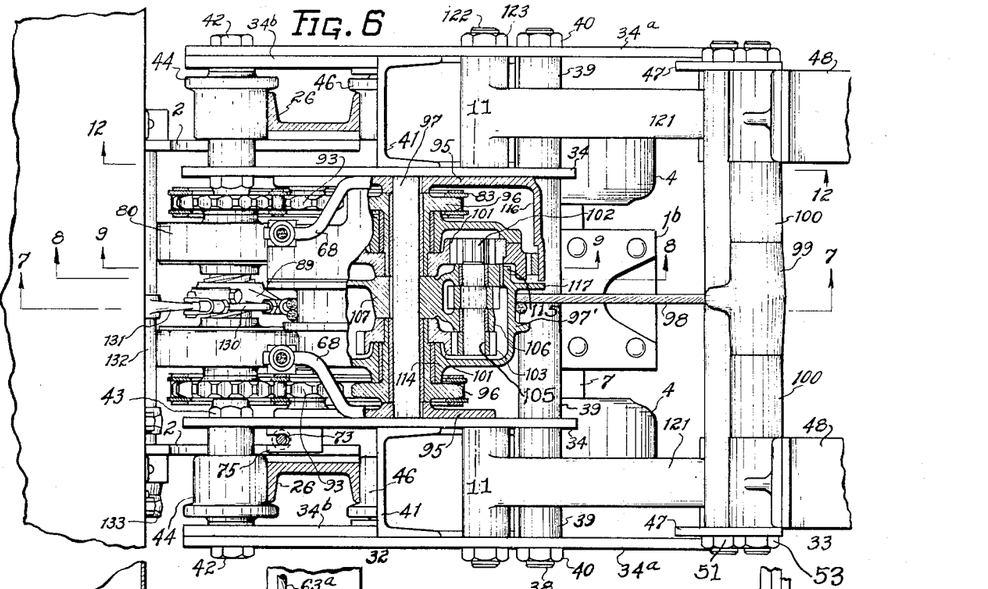
Fig. 6 is a fragmentary section on the line 6—6 of Fig. 1, with parts in section on the line 6a—6a of Fig. 7.

The driving connections between each sprocket 96 and the drum 97' comprise the following: 101 indicates a gear fixed to the inner end of the hub for each sprocket 96. One gear 101 is in mesh with diametrically arranged pinions 102, 102, and the other gear 101 is in mesh with diametrically arranged pinions 103, 103. Each pinion is fixed to a shaft 104, which is mounted in spaced bearings 105 provided on the web 106 of an intermediated member or support 107, the latter being keyed to the shaft 97 and held stationary thereby. Between the bearings 105 for adjacent shafts 104, the latter are provided with miter gears 108 in mesh with each other, so that when one gear 101 is rotated the gears 102 will be rotated in one direction and when the other gear 101 is rotated the gears 102 will be rotated in the opposite direction, for a purpose later set forth. As shown in Figs. 6 and 9, the gears 102 mesh with an internal gear 109 fixed to a driver 110 to rotate it, the driver having a hub 111, which loosely rotates on the hub of the adjacent sprocket 96 (see Fig. 6). The driver 110 is provided with a flange 112 which is cut-away at one side in its circumference to receive a lug 113 provided on the drum 97', so that when the driver is rotated in either direction one end wall of its flange will engage the lug 113 and through it rotate the drum. The drum 97' is provided at one side with a side wall which terminates in a hub 114 free to rotate on the hub of the other sprocket 96; at its other side the drum 97' is provided with an annular wall 115 which has bearing on the periphery of the support 107, the lug 113 being formed integrally with the wall 115. To prevent rotation of the drum 97' due to pull on the cable 98 I provide between the driver 110 and a stationary wall a brake arranged to be effective to prevent rotation of the drum, as above stated, but which is automatically released when power is applied through the driver 110 to rotate the drum. The stationary wall above referred to consists of an annulus 116 integrally connected to the side plate 95' remote from the drum 97' and aside from its function as a braking element, it co-operates with a flange 117 on the wall 115 and side walls of the drum 97' to enclose the gears already described. 118 indicates a brake band frictionally engaging the inner wall of the annulus 116 and having at its opposite ends inwardly extending lugs 119 disposed between the ends of the driver flange 112 on the outer side of and beyond the lug 113. Between the brake lugs 119 I provide a wedge 120, the upper walls of which are inclined in opposite directions and fit correspondingly shaped walls on the brake lugs, so that outward movement of the wedge 120 will tend to separate the brake lugs and thus expand the brake band against the annulus 116. The wedge 120 is seated on a flattened portion of the drum 97' (see Fig. 9), so that if the latter rotates due to any effort applied to it instead of the driver, the wedge will move outwardly and result in forcing the band into frictional engagement with the annulus, the effect of which is to lock the drum against rotation; for example, when the carrier 33 is in normal position (Fig. 1) it tends to swing outwardly and when the carrier is loaded this tendency is increased, and this tendency causes a pull on the cable 98, but as the drum is locked by the brake band 118, the carrier is held against outward movement. On the other hand when force is applied to the driver 110 to rotate the drum, one end of the driver flange 112 will engage the adjacent brake lug and automatically release the band from the annulus and thus permit the driver flange to engage the lug 113 and through the latter rotate the drum. Thus it will be seen that when the driver 110 is rotated in one direction, it will tilt the carrier from its normal position inwardly or from its outwardly tilted position to normal position or to its inwardly tilted position; and when rotated in the opposite direction, the cable 98 is payed out, which permits the carrier to swing under the influence of gravity from normal to its outwardly tilted position, or if loaded and titlted inwardly the load will cause it to swing outwardly.

Figure 12:
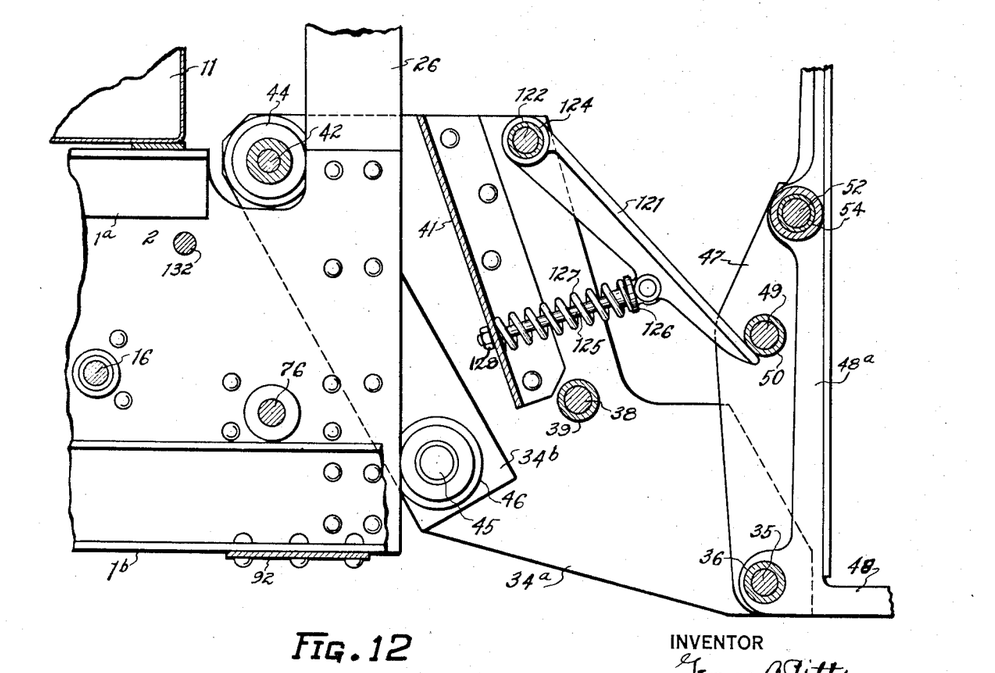
Fig. 12 is a fragmentary section substantially on the line 12—12 of Fig. 6.
Figure 13:
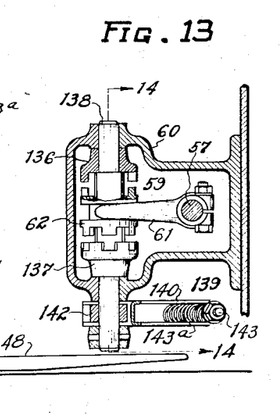
Fig. 13 is a section on the line 13—13 of Fig. 1.

121 indicates a pair of devices acted upon by suitable springs and co-operating with the tilting mechanism to maintain the carrier in normal position and to return it to normal position when the carrier is tilted inwardly. The devices 121 have a predetermined limit of inward movement and preferably limit the inward movement of the carrier, that is, the drum 97' being locked by the brake band 118, the cable 98 limits the outward movement of the carrier, and the spring operated devices 121 tend normally to prevent inward tilting of the carrier, whether it is loaded or unloaded. The devices comprise arms each loosely pivoted at its inner end on a shaft mounted at its ends in the adjacent pair of plates 34, 34a. The shaft consists of a bolt 122 having its head countersunk in the plate 34 and connected to the plate 34a by a nut 123 and a bushing 124 (Figs. 7 and 12). The outer end of the arm 121 engages the inner side of the rod 49, or a sleeve 50 and is normally forced outwardly by a spring mechanism, being limited in such outward movement, to maintain the carrier 33 in normal position or against inward movement, except when the tilting mechanism is operated. The sleeve 50 is loose on the rod 49 and rolls on the arms 121 during tilting of the carrier. The spring mechanism for each arm 121 comprises a rod 125 pivoted at its outer end to the arm 121 and having a collar 126 forming an abutment and a spring 127 coiled around the rod and engaging the abutment 126 at one end and the channel 41 at its opposite end. The rod 125 extends through an opening formed in the channel 41, the walls of the opening forming a guide for the outer end of the rod and permitting it to swivel as well as slide therein. The outer end of the rod carries an adjustable head (preferably a nut 128 threaded thereon), which engages the channel 41 to limit outward swinging movement of the arms 121, which outward movement of the arms 121 is predetermined by the position of the arms when the carrier 33 is in normal position. When the carrier is swung or tilted from its normal position inwardly, the sleeve 49 rides on the arms 121 and forces them inwardly against the tension of the springs 127, the limit of compression of the springs serving to limit the inward swing of the arms 121 which in turn limit the inward tilting of the carrier.

128 indicates as an entirety means for rotating the nut 88 in either direction. The rotating means 128 include an operating device 129, which when operated in either direction effects tilting of the carrier 33. However, since the hoisting means in raising or lowering the elevating member 31 operates the tilting mechanism, it will be noted that if movement of one chain 83 is stopped in the raising of the elevating member, due to rotation of the nut 88 in one direction, the carrier will be tilted in one direction and if the same chain is stopped in the lowering of the elevating member due to the rotation of the nut 88 in the same direction, the carrier will be tilted in the opposite direction. I therefore interconnect the turning means 128 with the shaft of the controller 56 through the double throw clutch 59, so that when the elevating member is being raised or lowered, operation of the device 129 in one direction will swing the carrier inwardly and when the device 129 is moved in the opposite direction the carrier will swing outwardly. Of the turning means 128, 130 indicates a link connecting the arm 89 to an arm 131 fixed to a rock shaft 132 preferably rotatably supported by the plates 2. On one extended end the rock shaft 132 is provided with a lever 133, the free ends of which are disposed upon opposite sides of the rock shaft 132 and have pivoted to them the inner ends of links 134, 135. The outer ends of the links 134, 135, are pivotally connected to arms 136, 137, respectively, loosely mounted on a shaft 138. The shaft 138 has bearing in the end walls of the casing 60 and extends therethrough at one end for connection to the operating device 129, whereby operation of the latter will rotate the shaft 138 in one direction or the other. The hubs of the arms 136, 137, are provided with clutch elements complementary to the clutch elements on the clutch member 62, which being splined to the shaft 138 and slidable thereon will connect either arm 136, 137, to the shaft 138 when moved into engagement therewith. As the double throw clutch member 62 is connected through the arm 61 to the operating shaft 57 for the controller 56, it will be seen that when the latter is operated to raise the elevating member 31, one arm 136 is connected to the shaft 138 and when the controller is operated to lower the member 31 the other arm 137 is connected to the shaft 138; accordingly, whether the elevating member is being raised or lowered, operation of the device 129 in one direction (for example, clockwise as viewed in Fig. 1) will effect tilting of the carrier 33 inwardly and operation of the device in the opposite direction will effect tilting of the carrier 33 outwardly.

The operating device 129 is preferably acted upon by a spring mechanism indicated as an entirety at 139 so that upon the release thereof it and the turning means will return to normal or neutral position and move the clutch member 78 to its mid position and thus permit free movement of the chains 83 about their sprockets 82, 84. Of the spring mechanism 139, 140, 141, indicate a pair of levers pivoted at their inner ends on diametrically opposite sides of a collar 142 loose on the shaft 138 and disposed between the device 129 and the casing 60. The outer portions of the levers 140, 141, are formed with aligned openings through which a rod 143 extends. The outer ends of the rod 143 are provided with heads, such as washers held in position by nuts threaded on the rod, and between each head and the adjacent lever is an expansion spring 143a coiled around the rod. 144 is a finger extending from the hub of the device 129 to a point between the levers 140, 141, as shown in Fig. 14, and arranged to swing one of the levers about its pivot when the device is operated. 145 is a stop preferably formed integrally with the casing 60 and extending to a point between the levers 140, 141, and arranged to prevent movement of either lever when the other is operated by the finger 144. In the form of construction above described the springs 143a act on the levers 140, 141, and through the latter normally maintain the device 129 and parts connected thereto in normal position. When the device 129 is operated in one direction, one lever 140 or 141 is swung about its pivot in opposition to the springs 143a, whereas the other lever is held stationary by the stop 145, so that both springs are put under tension and normally tend to return device 129 and connected parts to normal position upon the release of the device 129.

The guide sheaves 67 are loosely mounted on a shaft 146 which is movably supported on the movable member of a mechanism for taking up slack in the cables 63a, and such mechanism is preferably connected to the limit switch mechanism 69 whereby the motor 55a is stopped when undue slack occurs in the cables. Such mechanism and its connection with the limit switch mechanism is preferably similar to that forming the subject-matter of Letters Patent No. 1,773,860, dated August 26, 1930, for which reason a description thereof herein will not be necessary.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In an industrial truck, the combination of a wheel mounted frame, a guide thereon, an elevating member comprising a carriage slidably engaging said guide and a carrier swingably mounted on said carriage, mechanism on said carriage and connected to said carrier and arranged to be operated by the vertical movement of said carriage, for swinging the carrier in one direction and controlling its swinging in the other direction, hoisting means for raising and lowering said elevating member, and means for connecting said swinging mechanism to said frame during movement of said elevating member.

2. In an industrial truck, the combination of a wheel mounted frame, a guide thereon, an elevating member comprising a carriage slidably engaging said guide and a carrier swingably mounted on said carriage, mechanism on said carriage and connected to said carrier and arranged to be operated by the vertical movement of said carriage, for swinging the carrier in one direction and controlling its swinging in the other direction, hoisting means for raising and lowering said elevating member, and means, including a friction clutch, for connecting said swinging mechanism to said frame during movement of said elevating member.

3. In an industrial truck, the combination of a wheel mounted frame, a guide thereon, an elevating member comprising a carriage slidably engaging said guide and a carrier swingably mounted on said carriage, mechanism on said carriage and connected to said carrier for swinging it in one direction and controlling its swinging in the other direction, hoisting means for raising and lowering said elevating member, and means for connecting said mechanism to said frame during movement of said carriage, whereby further movement of the latter effects operation of said mechanism.

4. In an industrial truck, the combination of a wheel mounted frame, a guide thereon, an elevating member comprising a carriage slidably engaging said guide and a carrier swingably mounted on said carriage, mechanism on said carriage and connected to said carrier for swinging it in one direction and controlling its swinging in the other direction, hoisting means for raising and lowering said elevating member, said hoisting means having an operating device, and means for connecting said mechanism to said frame during movement of said carriage, whereby further movement of the latter effects operation of said mechanism, said last mentioned means being interconnected to said operating device.

5. In an industrial truck, the combination of a wheel mounted frame, a guide thereon, an elevating member comprising a carriage slidably engaging said guide and a carrier swingably mounted on said carriage, mechanism on said carriage and connected to said carrier for swinging it in one direction and controlling its swinging in the other direction, hoisting means for raising and lowering said elevating member, a member operatively connected to said mechanism and movable with said carriage relative to said frame and arranged to operate said mechanism during movement of the carriage when restrained against movement relative to said frame, and means on said frame for engaging and disengaging said member to control its movement with and relative to said carriage.

6. In an industrial truck, the combination of a wheel mounted frame, a guide thereon, an elevating member comprising a carriage slidably engaging said guide and a carrier swingably mounted on said carriage, mechanism on said carriage and connected to said carrier for swinging it in one direction and controlling its swinging in the other direction, said mechanism including a rotatable guide, a flexible member having a portion engaging with and supported by said guide, guides rotatably supported on said frame for movably supporting other portions of said flexible member, whereby movement of said mechanism with said carriage carries said flexible member with it, hoisting means for raising and lower said elevating member, and means engaging said flexible member to hold it stationary during movement of said carriage, whereby said swinging mechanism is actuated.

7. In an industrial truck, the combination of a wheel mounted frame, a guide thereon, an elevating member comprising a carriage slidably engaging said guide and a carrier swingably mounted on said carriage, mechanism on said carriage and connected to said carrier for swinging it in one direction and controlling its swinging in the other direction, a flexible member movably mounted on said frame and having an intermediate portion operatively engaging said mechanism, whereby movement of the latter with said carriage carries said flexible member with it, means for raising and lowering said carriage, and means arranged to arrest movement of said flexible member, whereby continued movement of said carriage effects actuation of said mechanism.

8. In an industrial truck, the combination of a wheel mounted frame, a guide thereon, an elevating member comprising a carriage slidably engaging said guide and a carrier mounted on said carriage to swing from normal position in either direction, mechanism on said carriage and connected to said carrier for swinging it in one direction and controlling its swinging in the other direction, hoisting means for raising and lowering said elevating member, means for effecting operation of said swinging mechanism during movement of said elevating member in either direction, and separate means for swinging said carrier from one operated position to its normal position.

9. In an industrial truck, the combination of a wheel mounted frame, a guide thereon, an elevating member comprising a carriage slidably engaging said guide and a carrier mounted on said carriage to swing from normal position in either direction, mechanism on said carriage and connected to said carrier for swinging it in one direction and controlling its swinging in the other direction, hoisting means for raising and lowering said elevating member, means for effecting operation of said swinging mechanism during movement of said elevating member in either direction, and spring operated means for swinging said carrier from one operated position to its normal position.

10. In an industrial truck, the combination of a wheel mounted frame, a guide thereon, an elevating member comprising a carriage slidably engaging said guide and a carrier mounted on said carriage to swing from normal position in either direction, mechanism on said carriage and connected to said carrier for swinging it in one direction and controlling its swinging in the other direction, spring operated means co-operating with said mechanism to maintain said carrier in normal position and arranged to return said carrier to normal position from one operated position thereof, hoisting means for raising and lowering said elevating member, and means for effecting operation of said swinging mechanism during movement of said elevating member in either direction.

11. In an industrial truck, the combination of a wheel mounted frame, a guide thereon, an elevating member comprising a carriage slidably engaging said guide and a carrier swingably mounted on said carriage, mechanism on said carriage and connected to said carrier for swinging it in one direction and controlling its swinging in the other direction, and having a pair of rotatable guide elements arranged when operated to effect operation of said mechanism, a pair of flexible members having their ends movably mounted on said frame and engaging said elements whereby said flexible members move with said carriage and mechanism, hoisting means for raising and lowering said elevating member, and means on said frame arranged to engage either one of said flexible members to arrest its movement, whereby one of said guide elements is rotated.

12. In an industrial truck, the combination of a wheel mounted frame, a guide thereon, an elevating member comprising a carriage slidably engaging said guide and a carrier mounted on said carriage to swing from normal position in either direction, mechanism on said carriage and connected to said carrier for swinging it in one direction and controlling its swinging in the other direction, and having a pair of rotatable guide elements arranged when operated to effect operation of said mechanism, a pair of flexible members having their ends movably mounted on said frame and engaging said elements whereby said flexible members move with said carriage and mechanism, hoisting means for raising and lowering said elevating member, and means on said frame arranged to engage either one of said flexible members to arrest its movement, whereby one of said guide elements is rotated, said last mentioned means including an operating device having connection therewith and means for reversing the connection between said device and said means.

13. In an industrial truck, the combination of a wheel mounted frame, a guide thereon, an elevating member comprising a carriage slidably engaging said guide and a carrier mounted on said carriage to swing from normal position in either direction, mechanism on said carriage and connected to said carrier for swinging it in one direction and controlling its swinging in the other direction, hoisting means for raising and lowering said elevating member, said hoisting means having an operating device, a pair of operating members operatively connected to said mechanism and movable with said carriage, means on said frame for engaging either of said operating members to arrest its movement with said carriage during movement thereof, and operating connections for said means interconnected with said operating device and arranged to be set by said device when the latter is operated.

14. In an industrial truck, the combination of a wheel mounted frame, a guide thereon, an elevating member comprising a carriage slidably engaging said guide and a carrier swingably mounted on said carriage, a driver on said carriage, a rotatable member having connection with said carrier for swinging it in one direction and controlling its swinging in the other direction, operating connections between said driver and member, separate connections for rotating said driver in either direction, means on said frame for engaging either of said connections to effect operation of said driver, and hoisting means for said elevating member.

15. In an industrial truck, the combination of a wheel mounted frame, a guide thereon, an elevating member comprising a carriage slidably engaging said guide and a carrier swingably mounted on said carriage, a driver on said carriage, a rotatable member having connection with said carrier for swinging it in one direction and controlling its swinging in the other direction, operating connections between said driver and member, separate connections for rotating said driver in either direction, means on said frame for engaging either of said connections to effect operation of said driver, hoisting means for said elevating member, and a brake interposed between said carriage and said driver arranged to prevent rotation thereof when rotative effort is applied to said drum but arranged to release said driver when said engaging means are operated.

16. In an industrial truck, the combination of a wheel mounted frame, a guide thereon, an elevating member comprising a carriage slidably engaging said guide and a carrier swingably mounted on said carriage, a driver on said carriage, a pair of sprockets on said carrier, gearing between said sprockets and driver, arranged to rotate the latter in one direction when one sprocket is rotated and to rotate the driver in the opposite direction when the other sprocket is rotated, a movable member operatively connected to said driver, a connection between said carrier and said movable member, a pair of chains engaging said sprockets and movable with the carriage, means arranged to engage either one of the chains to arrest its movement with the carriage, whereby the adjacent sprocket is rotated, and hoist means for raising and lowering said elevating member.

17. In an industrial truck, the combination of a wheel mounted frame, a guide thereon, an elevating member comprising a carriage slidably engaging said guide and a carrier swingably mounted on said carriage, a driver on said carriage, a pair of sprockets on said carriage, gearing between said sprockets and driver, arranged to rotate the latter in one direction when one sprocket is rotated and to rotate the driver in the opposite direction when the other sprocket is rotated, a movable member operatively connected to said driver, a connection between said carrier and said movable member, a pair of chains engaging said sprockets and movable with the carriage, means arranged to engage either one of the chains to arrest its movement with the carriage, whereby the adjacent sprocket is rotated, hoist means for raising and lowering said elevating member, operating devices for said engaging means, and means for controlling the direction of movement of said operating devices dependent on the direction of movement of said elevating member.

18. In an industrial truck, the combination of a wheel mounted frame, a guide thereon, an elevating member comprising a carriage slidably engaging said guide and a carrier swingably mounted on said carriage, a driver on said carriage, a pair of sprockets on said carriage, gearing between said sprockets and driver, arranged to rotate the latter in one direction when one sprocket is rotated and to rotate the driver in the opposite direction when the other sprocket is rotated, a movable member operatively connected to said driver, a connection between said carrier and said movable member, a pair of chains engaging said sprockets and movable with the carriage, means arranged to engage either one of the chains to arrest its movement with the carriage, whereby the adjacent sprocket is rotated, and hoist means for raising and lowering said elevating member, said engaging means including a friction clutch to permit slippage.

19. In an industrial truck, the combination of a wheel mounted frame, a guide frame thereon, an elevating member comprising a carriage slidably engaging said guide frame and a carrier mounted on said carriage to swing from normal position in either direction, mechanism on said carriage and connected to said carrier for tilting it inwardly and controlling its tilting outwardly, means for raising and lowering said carriage, and means for connecting said mechanism to one of said frames, said mechanism when connected to one of said frames being operated by the vertical movement of said carriage to swing said carrier in one direction and permitting it to swing in the opposite direction.

20. In an industrial truck, the combination of a wheel mounted frame, a guide frame thereon, an elevating member comprising a carriage slidably engaging said guide frame and a carrier swingably mounted on said carriage, means carried by one of said frames and carriage for connecting said carrier to said frame and disconnecting it therefrom, means for raising and lowering said carriage and operating when said carrier is connected to said frame to swing it relative to said carriage in one direction, and means on said carriage for yieldingly preventing inward movement of said carrier when it is disconnected from said frame.

21. In an industrial truck, the combination of a wheel mounted frame having a substantially vertical guide, a carriage movable on said guide, a carrier having a load engaging portion normally disposed horizontally and mounted on said carriage to swing relative thereto into an inclined position at either side of its normal position, connections between said carrier and said frame and arranged to be connected thereto and disconnected therefrom, and means for raising and lowering said carriage and operating when said connections are connected to said frame to swing said carrier relative to said carriage.

22. In an industrial truck, the combination of a wheel mounted frame having a substantially vertical guide, a carriage movably mounted on said guide, a carrier having a load engaging portion normally disposed horizontally and mounted on said carriage to swing relative thereto into an inclined position at either side of its normal position, connections between said carrier and said frame and arranged to be connected thereto and disconnected therefrom, means for raising and lowering said carriage and operating when said carrier is connected to said frame to swing it relative to said carriage, devices for operating said connections and said raising and lowering means, respectively, and interconnections between said devices arranged to automatically set said operating device for said connections, whereby operation of the latter device in a predetermined direction will incline said carrier in the corresponding direction in the movement of said raising and lowering means in either direction.

23. In an industrial truck, the combination of a wheel mounted frame having a substantially vertical guide, a carriage mounted on said guide to move upwardly and downwardly, a carrier having a load engaging portion normally disposed horizontally and mounted on said carriage to swing inwardly relative thereto into an inclined position, means carried by said carriage and frame for operatively connecting and disconnecting said carrier to said frame, the element of said means carried by said frame comprising a member extending longitudinally of said guide and movable with said carriage, devices for operating said connecting and disconnecting means, and means for raising and lowering said carriage and operating when said carrier is connected to said frame to swing it inwardly relative to said carriage.

24. In an industrial truck, the combination of a wheel mounted frame having a substantially vertical guide, a carriage mounted on said guide to move upwardly and downwardly, a carrier having a load engaging portion normally disposed horizontally and mounted on said carriage to swing inwardly relative thereto into an inclined position, means carried by said carriage and frame for operatively connecting and disconnecting said carrier to said frame, the element of said means carried by said frame comprising a member extending longitudinally of said guide and movable with said carriage, devices for operating said connecting and disconnecting means, one of said devices comprising a friction clutch, and means for raising and lowering said carriage and operating when said carrier is connected to said frame to swing it inwardly relative thereto.

25. In an industrial truck, the combination of a wheel mounted frame having a substantially vertical guide, a carriage mounted on said guide to move upwardly and downwardly, a carrier having a load engaging portion normally disposed horizontally and mounted on said carriage to swing inwardly relative thereto into an inclined position, means carried by said carriage and frame for operatively connecting and disconnecting said carrier to said frame, the elements of said means carried by said carriage comprising a driver, an operating member connected to said carrier, brake means normally tending to hold said operating member stationary, gearing between said driver and said operating member and devices on said driver arranged to release said brake means when said driver is operated, devices on said frame for operating said connecting and disconnecting means, and means for raising and lowering said carriage and operating when said carrier is connected to said frame to swing it inwardly relative to said carriage.

GEORGE B. PITTS.